(12) United States Patent
Larsen

(10) Patent No.: US 9,093,928 B2
(45) Date of Patent: Jul. 28, 2015

(54) METHODS AND SYSTEMS FOR CONTROLLING A POWER CONVERTER

(75) Inventor: Einar Vaughn Larsen, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 658 days.

(21) Appl. No.: 13/454,647

(22) Filed: Apr. 24, 2012

(65) Prior Publication Data

US 2013/0278308 A1    Oct. 24, 2013

(51) Int. Cl.
*H02J 3/24* (2006.01)
*H03L 7/06* (2006.01)
*H02P 9/00* (2006.01)

(52) U.S. Cl.
CPC .................................... *H02P 9/00* (2013.01)

(58) Field of Classification Search
None
See application file for complete search history.

(56) References Cited

U.S. PATENT DOCUMENTS

| 4,741,023 | A | * | 4/1988 | Lawson | 379/106.01 |
| 5,798,633 | A | * | 8/1998 | Larsen et al. | 323/207 |
| 7,855,539 | B1 | | 12/2010 | Wong et al. | |
| 2011/0199072 | A1 | | 8/2011 | Kerkman et al. | |

OTHER PUBLICATIONS

Larsen, E.V., "Applying Power System Stabilizers Part I: General Concepts," IEEE Transactions on Power Apparatus and Systems, vol. PAS-100, No. 6 Jun. 1981, pp. 3017-3045.

* cited by examiner

*Primary Examiner* — Jared Fureman
*Assistant Examiner* — Aqeel Bukhari
(74) *Attorney, Agent, or Firm* — James McGinness, Esq.; Armstrong Teasdale LLP

(57) ABSTRACT

A stabilizer system associated with a power converter controller is described. The stabilizer system includes a regulator stabilizer configured to receive a phase locked loop (PLL) error signal and to generate a regulator stabilization signal based at least partially on the PLL error signal. The stabilizer system also includes a regulator coupled to the regulator stabilizer and a converter interface controller. The regulator is configured to receive the regulator stabilization signal, generate a first command signal, based at least partially on the regulator stabilization signal, that reduces system oscillations, and transmit the first command signal to the converter interface controller.

20 Claims, 14 Drawing Sheets

METHODS AND SYSTEMS FOR CONTROLLING A POWER CONVERTER

BACKGROUND OF THE INVENTION

The subject matter described herein relates generally to controlling operation of power generation and delivery systems, and more specifically, to stabilizing a power converter after an electrical grid contingency event.

Wind turbine generators utilize wind energy to produce electrical power. Wind turbine generators typically include a rotor having multiple blades that transform wind energy into rotational motion of a drive shaft, which in turn is utilized to drive an electrical generator to produce electrical power. Each of the multiple blades may be pitched to increase or decrease the rotational speed of the rotor. A power output of a wind turbine generator increases with wind speed until the wind speed reaches a rated wind speed for the turbine. At and above the rated wind speed, the wind turbine generator operates at a rated power.

Variable speed operation of the wind turbine generator facilitates enhanced capture of energy by the wind turbine generator when compared to a constant speed operation of the wind turbine generator. However, variable speed operation of the wind turbine generator produces electricity having varying voltage and/or frequency. More specifically, the frequency of the electricity generated by the variable speed wind turbine generator is proportional to the speed of rotation of the rotor. A power converter may be coupled between the electric generator and an electrical grid. The power converter outputs electricity having a fixed voltage and frequency for delivery on the electrical grid.

Power generated by an electric utility, using renewable sources of energy or fossil fuel based sources of energy, is typically delivered to a customer over an electrical grid. Electricity applied to the electrical grid is required to meet grid connectivity expectations. These requirements address safety issues as well as power quality concerns. For example, the grid connectivity expectations include operating the power generation system during a transient event, also referred to herein as a grid fault event and/or a grid contingency event. This capability may be referred to as low voltage ride through (LVRT) or zero voltage ride through (ZVRT). An LVRT/ZVRT event is a condition where the alternating current (AC) utility voltage is low on either one phase of the electrical grid or multiple phases of the electrical grid. During an LVRT/ZVRT event, the capacity of the electrical grid to accept power from the power generation system is low. Following switching actions in the external grid, the impedance of the grid may increase substantially leading to a condition referred to herein as a "weak grid".

Operation of the power converter is controlled to facilitate LVRT/ZVRT. Once the LVRT/ZVRT event dissipates, the power converter is controlled to facilitate recovery from the event and return the power generation system to steady-state operation. During the recovery, system oscillations may cause instability, for example, instability in a power output by the power converter.

BRIEF DESCRIPTION OF THE INVENTION

In one aspect, a stabilizer system associated with a power converter controller is provided. The stabilizer system includes a regulator stabilizer configured to receive a phase locked loop (PLL) error signal and to generate a regulator stabilization signal based at least partially on the PLL error signal. The stabilizer system also includes a regulator coupled to the regulator stabilizer and a converter interface controller. The regulator is configured to receive the regulator stabilization signal, generate a first command signal, based at least partially on the regulator stabilization signal, that reduces system oscillations, and transmit the first command signal to the converter interface controller.

In another aspect, a converter controller for controlling operation of a power converter is provided. The converter controller includes a stabilizer system configured to receive a phase locked loop (PLL) error signal and generate a first command signal, based at least partially on the PLL error signal, that reduces system oscillations. The converter controller also includes a converter interface controller communicatively coupled to the stabilizer system and configured to generate control signals based at least partially on the first command signal and transmit the control signals to a power conversion assembly.

In yet another aspect, a method for controlling a power generation and delivery system that includes an electrical generator, a power converter, and a controller is provided. The method includes monitoring an output parameter of the power generation and delivery system indicative of system oscillations. The method also includes generating, using the controller, a command signal based at least partially on the output parameter. The method also includes controlling operation of the power converter based at least partially on the command signal to reduce system oscillations.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind turbine generator" is intended to be representative of any wind turbine that generates electrical power from rotational energy generated from wind energy, and more specifically, converts mechanical energy converted from kinetic energy of wind to electrical power.

Technical effects of the methods, systems, and computer-readable media described herein include at least one of: (a) monitoring an output parameter of the power generation and delivery system, wherein oscillations within the output parameter correspond to system oscillations; (b) generating a command signal based at least partially on the output parameter; and, (c) controlling operation of the power converter based at least partially on the command signal to reduce system oscillations.

The methods, systems, and computer readable media described herein facilitate reducing system oscillations that may occur during recovery from a grid contingency event. As described herein, a voltage regulator stabilizer generates a voltage regulator stabilization signal based at least partially on a measured PLL error. The voltage regulator stabilization signal is provided to a voltage regulator that determines a reactive current command based at least partially on the voltage regulator stabilization signal. Furthermore, a power regulator stabilizer may generate a power regulator stabilization signal based at least partially on the measured PLL error. The power regulator stabilization signal is provided to a power regulator that determines a real current command based at least partially on the power regulator stabilization signal. Controlling the reactive current output and/or the real current output of the power converter as a function of the PLL error facilitates reducing system oscillations that may occur during recovery from a grid contingency event. Furthermore, reducing system oscillations stabilizes the power generation system and utility grid. Although generally described herein with respect to a wind turbine, the methods and systems described herein are applicable to any type of electric generation system including, for example, solar power generation systems, fuel cells, geothermal generators, hydropower generators, and/or other devices that generate power from renewable and/or non-renewable energy sources.

Figure 1:
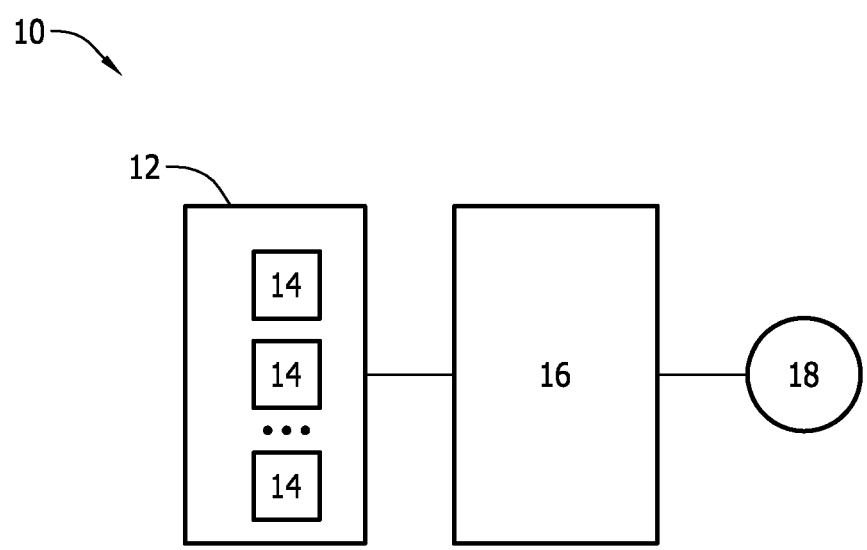
FIG. 1 is a block diagram of an exemplary power generation system.

FIG. 1 is a block diagram of an exemplary power generation system 10 that includes a power generator 12. Power generator 12 includes one or more power generation units 14. Power generation units 14 may include, for example, wind turbines, solar cells, fuel cells, geothermal generators, hydropower generators, and/or other devices that generate power from renewable and/or non-renewable energy sources. Although three power generation units 14 are shown in the exemplary embodiment, in other embodiments, power generator 12 may include any suitable number of power generation units 14, including only one power generation unit 14.

In the exemplary embodiment, power generator 12 is coupled to a power converter 16, or a power converter system 16, that converts a substantially direct current (DC) power output from power generator 12 to alternating current (AC) power. The AC power is transmitted to an electrical distribution network 18, or "grid." Power converter 16, in the exemplary embodiment, adjusts an amplitude of the voltage and/or current of the converted AC power to an amplitude suitable for electrical distribution network 18, and provides AC power at a frequency and a phase that are substantially equal to the frequency and phase of electrical distribution network 18. Moreover, in the exemplary embodiment, power converter 16 provides three phase AC power to electrical distribution network 18. Alternatively, power converter 16 provides single phase AC power or any other number of phases of AC power to electrical distribution network 18. Furthermore, in some embodiments, power generation system 10 may include more than one power converter 16. For example, in some embodiments, each power generation unit may be coupled to a separate power converter 16.

In an exemplary embodiment, power generation units 14 include solar panels coupled to form one or more solar arrays to facilitate operating power generation system 10 at a desired power output. Each power generation unit 14 may be an individual solar panel or an array of solar panels. In one embodiment, power generation system 10 includes a plurality of solar panels and/or solar arrays coupled together in a series-parallel configuration to facilitate generating a desired current and/or voltage output from power generation system 10. Solar panels include, in one embodiment, one or more of a photovoltaic panel, a solar thermal collector, or any other device that converts solar energy to electrical energy. In the exemplary embodiment, each solar panel is a photovoltaic panel that generates a substantially direct current power as a result of solar energy striking solar panels. In the exemplary embodiment, the solar array is coupled to power converter 16, or power converter system 16, that converts the DC power to alternating current power that is transmitted to electrical distribution network 18.

In other embodiments, power generation units 14 include one or more wind turbines coupled to facilitate operating power generation system 10 at a desired power output. Each wind turbine generates substantially direct current power. The wind turbines are coupled to power converter 16, or power converter system 16, that converts the DC power to AC power that is transmitted to an electrical distribution network 18, or "grid." Methods and systems will be further described herein with reference to such a wind turbine based power generation system. However, the methods and systems described herein are applicable to any type of electric generation system including, for example, fuel cells, geothermal generators, hydropower generators, and/or other devices that generate power from renewable and/or non-renewable energy sources.

Figure 2:
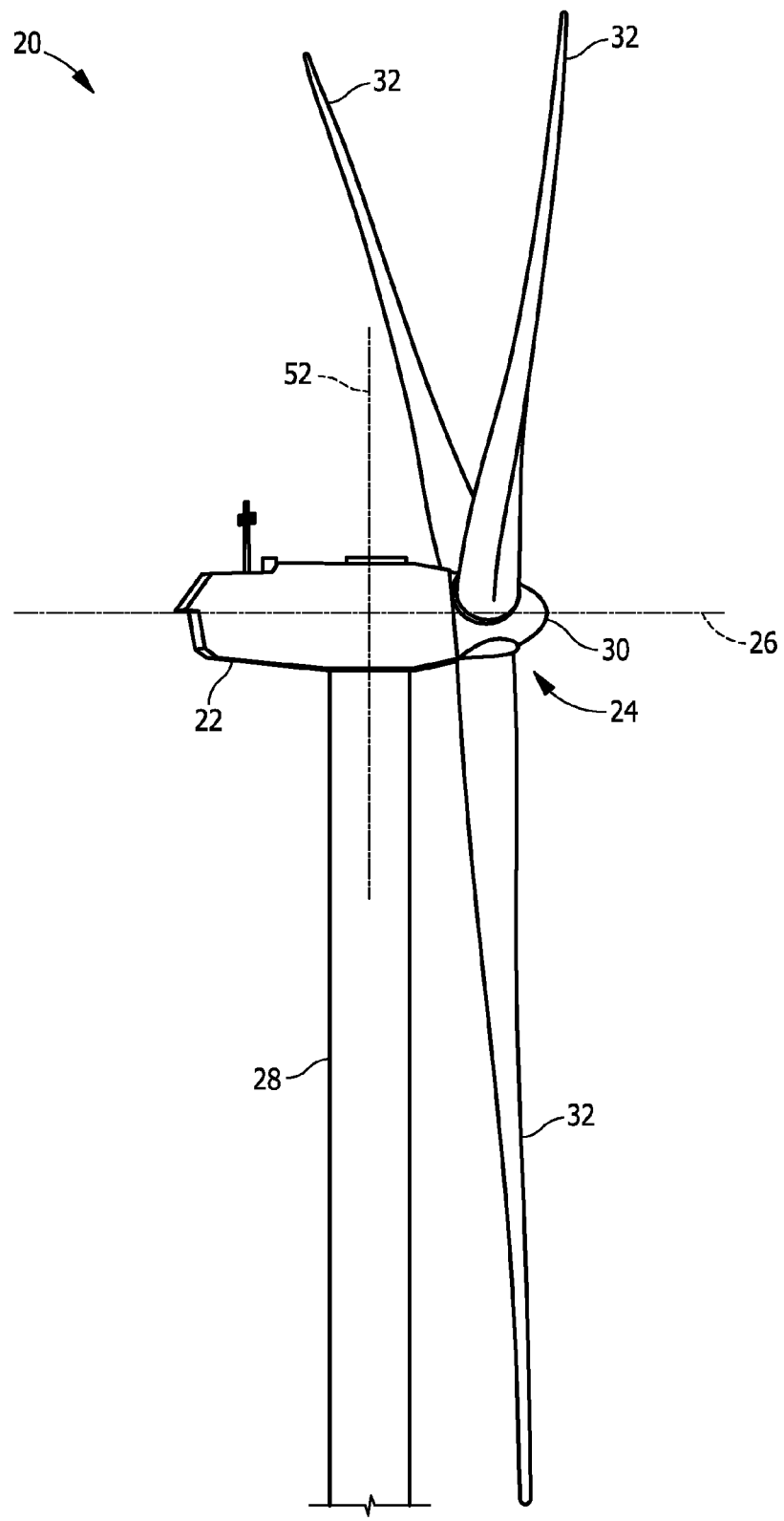
FIG. 2 is a perspective view of a portion of an exemplary wind turbine that may be used in the power generation system shown in FIG. 1.
Figure 3:
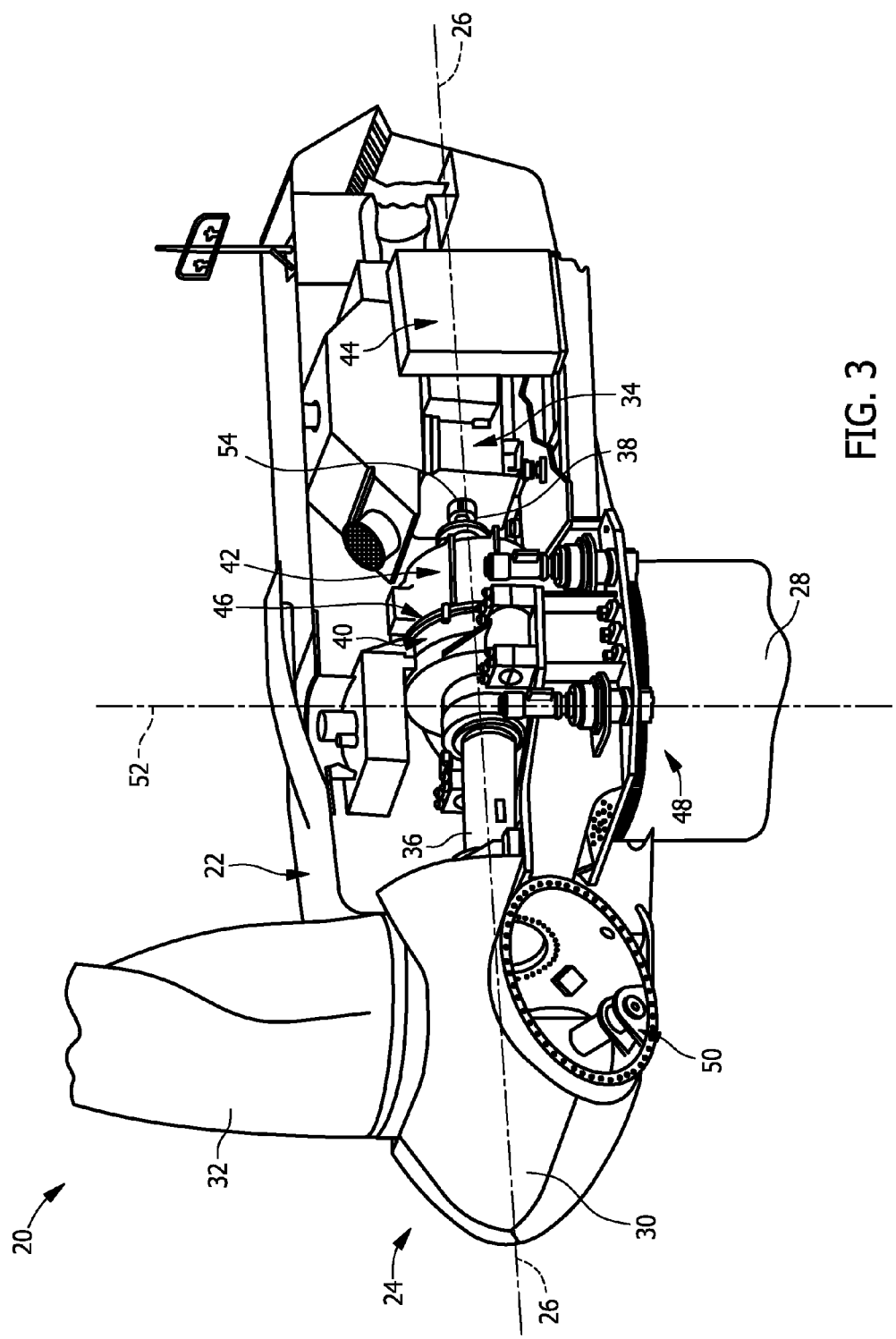
FIG. 3 is a partially cut-away view of a portion of the wind turbine shown in FIG. 2.

FIG. 2 is a perspective view of an exemplary wind turbine 20 that may be used in power generation system 10. FIG. 3 is a partially cut-away perspective view of a portion of wind turbine 20. Wind turbine 20 described and shown herein is a wind turbine generator for generating electrical power from wind energy. Moreover, wind turbine 20 described and illustrated herein includes a horizontal-axis configuration. However, in some embodiments, wind turbine 20 may include, in addition or alternative to the horizontal-axis configuration, a vertical-axis configuration (not shown). Wind turbine 20 may be coupled to an electrical load (not shown in FIG. 2), such as, but not limited to, a power grid, for receiving electrical power therefrom to drive operation of wind turbine 20 and/or its associated components and/or for supplying electrical power generated by wind turbine 20 thereto. Although only one wind turbine 20 is shown in FIGS. 2 and 3, in some embodiments, a plurality of wind turbines 20 may be grouped together, sometimes referred to as a "wind farm."

Wind turbine 20 includes a body or nacelle 22 and a rotor (generally designated by 24) coupled to nacelle 22 for rotation with respect to nacelle 22 about an axis of rotation 26. In the exemplary embodiment, nacelle 22 is mounted on a tower 28. However, in some embodiments, in addition or alternative to tower-mounted nacelle 22, nacelle 22 may be positioned adjacent the ground and/or a surface of water. The height of tower 28 may be any suitable height enabling wind turbine 20 to function as described herein. Rotor 24 includes a hub 30 and a plurality of blades 32 (sometimes referred to as "airfoils") extending radially outwardly from hub 30 for converting wind energy into rotational energy. Although rotor 24 is described and illustrated herein as having three blades 32, rotor 24 may have any number of blades 32. Blades 32 may each have any length that allows wind turbine 20 to function as described herein. For example, in some embodiments, one or more rotor blades 32 are about one-half meter long, while in some embodiments one or more rotor blades 32 are about fifty meters long. Other examples of blade 32 lengths include ten meters or less, about twenty meters, about thirty-seven meters, and about forty meters. Still other examples include rotor blades between about fifty and about one-hundred meters long, and rotor blades greater than one-hundred meters long.

Despite how rotor blades 32 are illustrated in FIG. 2, rotor 24 may have blades 32 of any shape, and may have blades 32 of any type and/or any configuration, whether such shape, type, and/or configuration is described and/or illustrated herein. One example of another type, shape, and/or configuration of blades 32 is a Darrieus wind turbine, sometimes referred to as an "eggbeater" turbine. Yet another example of another type, shape, and/or configuration of blades 32 is a Savonious wind turbine. Moreover, wind turbine 20 may, in some embodiments, be a wind turbine wherein rotor 24 generally faces upwind to harness wind energy, and/or may be a wind turbine wherein rotor 24 generally faces downwind to harness energy. Of course, in any of the embodiments, rotor 24 may not face exactly upwind and/or downwind, but may face generally at any angle (which may be variable) with respect to a direction of the wind to harness energy therefrom.

Referring now to FIG. 3, wind turbine 20 includes an electrical generator 34 coupled to rotor 24 for generating electrical power from the rotational energy generated by rotor 24. Generator 34 may be any suitable type of electrical generator, such as, but not limited to, a wound rotor induction generator, a double-fed induction generator (DFIG, also known as dual-fed asynchronous generators), a permanent magnet (PM) synchronous generator, an electrically-excited synchronous generator, and a switched reluctance generator. Generator 34 includes a stator (not shown) and a rotor (not shown) with an air gap included therebetween. Rotor 24 includes a rotor shaft 36 coupled to rotor hub 30 for rotation therewith. Generator 34 is coupled to rotor shaft 36 such that rotation of rotor shaft 36 drives rotation of the generator rotor, and therefore operation of generator 34. In the exemplary embodiment, the generator rotor has a generator shaft 38 coupled thereto and coupled to rotor shaft 36 such that rotation of rotor shaft 36 drives rotation of the generator rotor. In other embodiments, the generator rotor is directly coupled to rotor shaft 36, sometimes referred to as a "direct-drive wind turbine." In the exemplary embodiment, generator shaft 38 is coupled to rotor shaft 36 through a gearbox 40, although in other embodiments generator shaft 38 is coupled directly to rotor shaft 36.

The torque of rotor 24 drives the generator rotor to thereby generate variable frequency AC electrical power from rotation of rotor 24. Generator 34 has an air gap torque between the generator rotor and stator that opposes the torque of rotor 24. A power conversion assembly 42 is coupled to generator 34 for converting the variable frequency AC to a fixed frequency AC for delivery to an electrical load (not shown in FIG. 3), such as, but not limited to an electrical grid (not shown in FIG. 3), coupled to generator 34. Power conversion assembly 42 may include a single frequency converter or a plurality of frequency converters configured to convert electricity generated by generator 34 to electricity suitable for delivery over the power grid. Power conversion assembly 42 may also be referred to herein as a power converter. Power conversion assembly 42 may be located anywhere within or remote to wind turbine 20. For example, power conversion assembly 42 may be located within a base (not shown) of tower 28.

In the exemplary embodiment, wind turbine 20 includes at least one system controller 44 coupled to at least one component of wind turbine 20 for generally controlling operation of wind turbine 20 and/or controlling operation of the components thereof. For example, system controller 44 may be configured to control operation of power conversion assembly 42, a disk brake 46, a yaw system 48, and/or a variable blade pitch system 50. Disk brake 46 brakes rotation of rotor 24 to, for example, slow rotation of rotor 24, brake rotor 24 against full wind torque, and/or reduce the generation of electrical power from electrical generator 34. Yaw system 48 for rotating nacelle 22 about an axis of rotation 52 for changing a yaw of rotor 24, and more specifically for changing a direction faced by rotor 24 to, for example, adjust an angle between the direction faced by rotor 24 and a direction of wind.

Furthermore, variable blade pitch system 50 controls, including but not limited to changing, a pitch angle of blades 32 (shown in FIGS. 2-3) with respect to a wind direction. Pitch system 50 may be coupled to system controller 44 for control thereby. Pitch system 50 is coupled to hub 30 and blades 32 for changing the pitch angle of blades 32 by rotating blades 32 with respect to hub 30. The pitch actuators may include any suitable structure, configuration, arrangement, means, and/or components, whether described and/or shown herein, such as, but not limited to, electrical motors, hydraulic cylinders, springs, and/or servomechanisms. Moreover, the pitch actuators may be driven by any suitable means, whether described and/or shown herein, such as, but not limited to, hydraulic fluid, electrical power, electro-chemical power, and/or mechanical power, such as, but not limited to, spring force.

Figure 4:
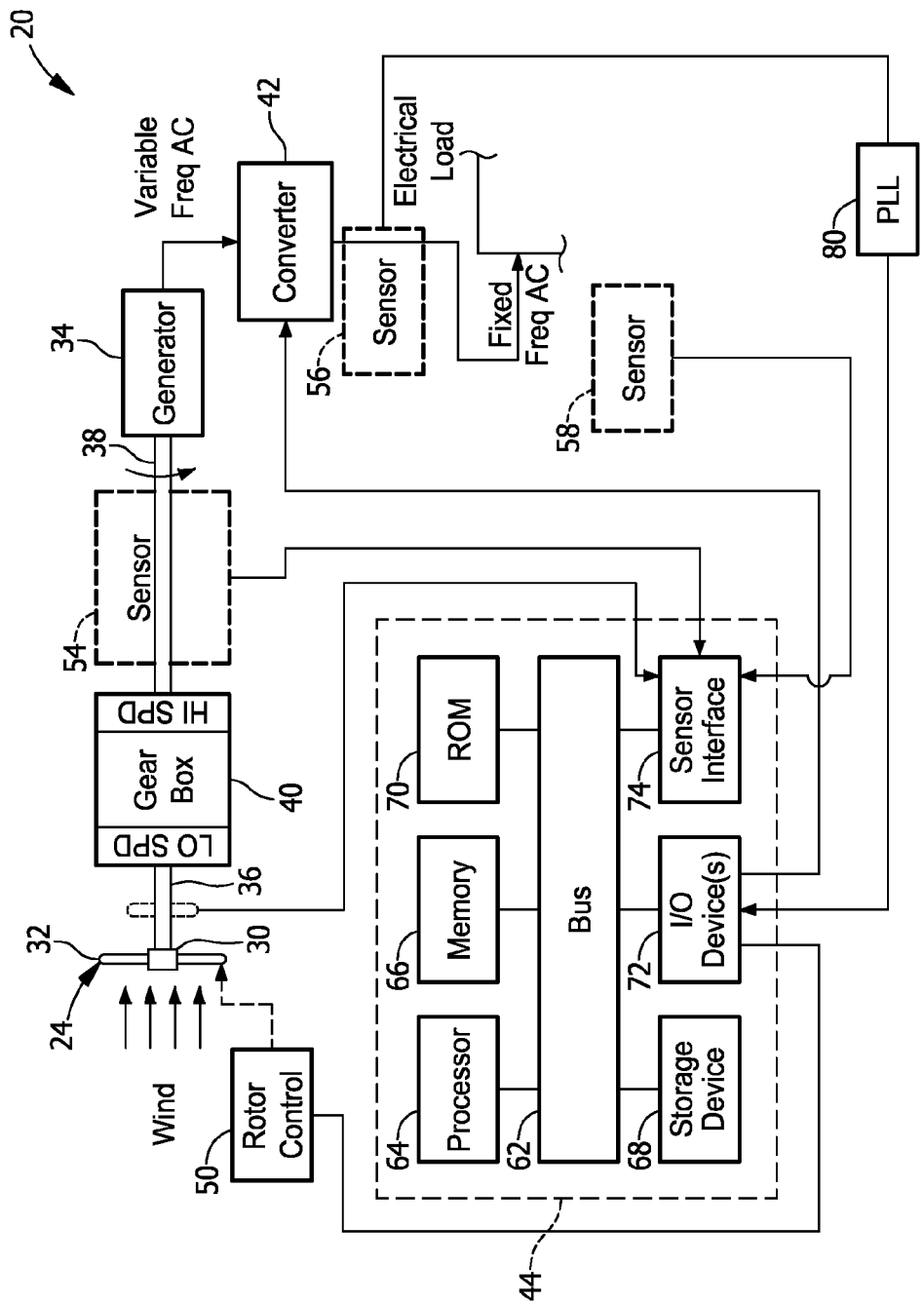
FIG. 4 is a block diagram of the wind turbine shown in FIG. 2.

FIG. 4 is a block diagram of an exemplary embodiment of wind turbine 20. In the exemplary embodiment, wind turbine 20 includes one or more system controller 44 coupled to at least one component of wind turbine 20 for generally controlling operation of wind turbine 20 and/or controlling operation of the components thereof, regardless of whether such components are described and/or shown herein. For example, in the exemplary embodiment system controller 44 is coupled to pitch system 50 for generally controlling rotor 24. In the exemplary embodiment, system controller 44 is mounted within nacelle 22 (shown in FIG. 3), however, additionally or alternatively, one or more system controller 44 may be remote from nacelle 22 and/or other components of wind turbine 20. System controllers 44 may be used for overall system monitoring and control including, without limitation, pitch and speed regulation, high-speed shaft and yaw brake application, yaw and pump motor application, and/or fault monitoring. Alternative distributed or centralized control architectures may be used in some embodiments.

In an exemplary embodiment, wind turbine 20 includes a plurality of sensors, for example, sensors 54, 56, and 58. Sensors 54, 56, and 58 measure a variety of parameters including, without limitation, operating conditions and atmospheric conditions. Each sensor 54, 56, and 58 may be an individual sensor or may include a plurality of sensors. Sensors 54, 56, and 58 may be any suitable sensor having any suitable location within or remote to wind turbine 20 that allows wind turbine 20 to function as described herein. In some embodiments, sensors 54, 56, and 58 are coupled to system controller 44 for transmitting measurements to system controller 44 for processing thereof.

In some embodiments, system controller 44 includes a bus 62 or other communications device to communicate information. One or more processor(s) 64 are coupled to bus 62 to process information, including information from sensors 54, 56, 58 and/or other sensor(s). Processor(s) 64 may include at least one computer. As used herein, the term computer is not limited to integrated circuits referred to in the art as a computer, but broadly refers to a processor, a microcontroller, a microcomputer, a programmable logic controller (PLC), an application specific integrated circuit, and other programmable circuits, and these terms are used interchangeably herein.

System controller 44 may also include one or more random access memories (RAM) 66 and/or other storage device(s) 68. RAM(s) 66 and storage device(s) 68 are coupled to bus 62 to store and transfer information and instructions to be executed by processor(s) 64. RAM(s) 66 (and/or storage device(s) 68, if included) can also be used to store temporary variables or other intermediate information during execution of instructions by processor(s) 64. System controller 44 may also include one or more read only memories (ROM) 70 and/or other static storage devices coupled to bus 62 to store and provide static (i.e., non-changing) information and instructions to processor(s) 64. Processor(s) 64 process information transmitted from a plurality of electrical and electronic devices that may include, without limitation, speed and power transducers. Instructions that are executed include, without limitation, resident conversion and/or comparator algorithms. The execution of sequences of instructions is not limited to any specific combination of hardware circuitry and software instructions.

System controller 44 may also include, or may be coupled to, input/output device(s) 72. Input/output device(s) 72 may include any device known in the art to provide input data to system controller 44 and/or to provide outputs, such as, but not limited to, yaw control and/or pitch control outputs. Instructions may be provided to RAM 66 from storage device 68 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 72 may include, without limitation, computer peripherals associated with an operator interface such as a mouse and a keyboard (neither shown in FIG. 4). Alternatively, other computer peripherals may also be used that may include, for example, a scanner (not shown in FIG. 4). Furthermore, in the exemplary embodiment, additional output channels may include, for example, an operator interface monitor (not shown in FIG. 4). System controller 44 may also include a sensor interface 74 that allows system controller 44 to communicate with sensors 54, 56, 58 and/or other sensor(s). Sensor interface 74 may include one or more analog-to-digital converters that convert analog signals into digital signals that can be used by processor(s) 64.

In an exemplary embodiment, wind turbine 20 includes a phase locked loop (PLL) regulator 80. PLL regulator 80 is coupled to sensor 56. In the exemplary embodiment, sensor 56 is a voltage transducer configured to measure a terminal grid voltage output by power conversion assembly 42. Alternatively, PLL regulator 80 is configured to receive a plurality of voltage measurement signals from a plurality of voltage transducers. In an example of a three-phase generator, each of three voltage transducers is electrically coupled to each one of three phases of a grid bus. PLL regulator 80 may be configured to receive any number of voltage measurement signals from any number of voltage transducers that allow PLL regulator 80 to function as described herein.

Figure 5:
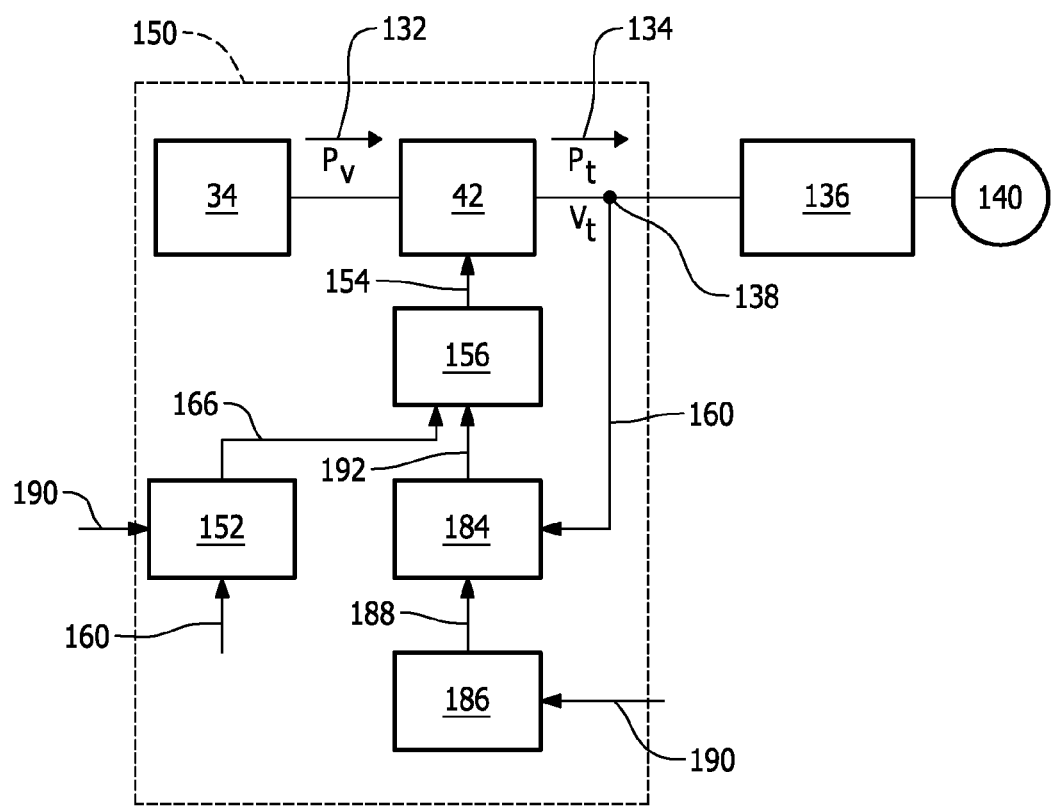
FIG. 5 is a block diagram of an exemplary power generation and delivery system that may include the wind turbine shown in FIG. 2.

FIG. 5 is a block diagram of an exemplary power generation and delivery system 150. Power generation and delivery system 150 may be used with, or included within, wind turbine 20 (shown in FIGS. 2 and 3). System 150 includes an energy source, for example, generator 34. Although described herein as wind turbine generator 34, the energy source may include any type of electrical generator that allows system 150 to function as described herein, e.g. a solar power generation system. System 150 also includes a power converter, such as, power conversion assembly 42. Power conversion assembly 42 receives electrical power (Pv) 132 generated by generator 34 and converts electrical power 132 to an electrical power (Pt) 134 (referred to herein as terminal power 134) suitable for transmission over an electric power transmission and distribution grid 136 (referred to herein as utility grid 136). A terminal voltage (Vt) 138 is defined at a node between power conversion assembly 42 and utility grid 136. A bulk power system 140 is coupled to utility grid 136. Bulk power system 140 includes a plurality of loads and/or power sources.

In the exemplary embodiment, system 150 includes a grid-dependent power limiter system 152. In the exemplary embodiment, a controller, for example, but not limited to, system controller 44 (shown in FIG. 4), is programmed to perform the functions of grid-dependent power limiter system 152. However, in alternative embodiments, the functions of grid-dependent power limiter system 152 may be performed by any circuitry configured to allow system 150 to function as described herein. Power limiter system 152 is configured to identify the occurrence of a grid contingency event, and provide power conversion assembly 42 with control signals that facilitate providing a stable recovery from the grid event. Generally, upon detection of a grid contingency event, power limiter system 152 provides signals to reduce the power output of power conversion assembly 42. During recovery from the grid contingency event, power limiter system 152 provides signals to increase the active power output of power conversion assembly 42. In some embodiments, power limiter system 152 provides a signal, or signals, to increase the active power output of power conversion assembly 42 gradually until the output power of power conversion assembly 42 is returned to its pre-fault level.

In the exemplary embodiment, system 150 also includes a stabilizer system 182 (shown in FIG. 6) configured to output a command signal that is provided to converter interface controller 156 and used to control operation of power converter 42. In the exemplary embodiment, a controller, for example, but not limited to, system controller 44 (shown in FIG. 4), is programmed to perform the functions of stabilizer system 182. However, in alternative embodiments, the functions of stabilizer system 182 may be performed by any circuitry configured to allow system 150 to function as described herein. Oscillations within an output of power converter 42 are reduced when power converter 42 is operated in accordance with control signals from converter interface controller 156 that are based at least partially on the command signal, for example, a reactive current command signal 192 and/or a real current command signal 166.

In the exemplary embodiment, stabilizer system 182 includes a regulator 184 and a regulator stabilizer 186. In the exemplary embodiment, regulator 184 is a voltage regulator configured to generate a reactive power command, for example, reactive current command signal 192. Regulator stabilizer 186 is configured to generate a regulator stabilization signal 188 that stabilizes regulator 184 as system 150 recovers from a grid contingency event. For example, regulator stabilizer 186 may generate a voltage regulator stabilization signal and/or a power regulator stabilization signal. In certain embodiments, power conversion assembly 42 responds according to the signals provided by stabilizer system 182 and reduces system oscillations that may occur during recovery from the grid event.

A grid event, also referred to herein as a grid contingency event, may leave utility grid 136 in a degraded mode where the grid impedance is high. An example of a grid event includes a short-circuit fault on one of the transmission lines within utility grid 136. Electrical transmission protection actions remove the faulted portion of utility grid 136 to permit operation of the remaining unfaulted portion of utility grid 136. A transmission path remains that is degraded in its ability to transmit power from system 150 to bulk power system 140. Such grid events cause a brief period of low voltage on utility grid 136 prior to clearing the faulted portion of the utility grid 136. Typically, terminal voltage 138 will be significantly degraded at the time of the grid event. The high grid impedance after the fault clearing can result in an oscillatory response of the regulators within the generator (e.g., power regulator 204 and/or voltage regulator 184). These oscillations are typically in a frequency range of approximately 10 hertz (Hz) to 30 Hz, and in some instances, can become unstable if not properly accounted for by system 150.

As shown in FIG. 5, in the exemplary embodiment, power conversion assembly 42 is configured to receive control signals 154 from a converter interface controller 156. Control signals 154 are based on sensed operating conditions or operating characteristics of wind turbine 20 as described herein and used to control the operation of power conversion assembly 42. Examples of measured operating conditions may include, but are not limited to, a terminal grid voltage, a PLL error, a stator bus voltage, a rotor bus voltage, and/or a current. For example, sensor 56 (shown in FIG. 4) measures terminal grid voltage 138 and transmits a terminal voltage feedback signal 160 to a voltage regulator 184 and power limiter system 152. Furthermore, PLL regulator 80 (shown in FIG. 4) may generate a PLL error signal 190 and transmit signal 190 to stabilizer system 182 and power limiter system 152.

In the exemplary embodiment, voltage regulator stabilizer 186 generates, based at least partially on PLL error signal 190, voltage regulator stabilization signal 188 and transmits voltage regulator stabilization signal 188 to voltage regulator 184. Voltage regulator 184 generates reactive current command signal 192, based at least partially on voltage regulator stabilization signal 188 and transmits reactive current command signal 192 to converter interface controller 156. In some embodiments power limiter system 152 also receives terminal voltage feedback signal 160 and generates a power command signal, for example, real current command signal 166 based at least partially on PLL error signal 190 and terminal voltage feedback signal 160. After a grid contingency event, PLL error signal 190 may oscillate as system 150 gradually increases an active power output of power conversion assembly 42. In other words, oscillations within PLL error signal 190 are indicative of system oscillations. Voltage regulator stabilizer 186 applies a transfer function to the oscillating PLL error signal 190, which outputs voltage regulator stabilization signal 188. This feedback loop is configured to reduce system oscillations.

More specifically, system oscillations occurring after a grid contingency event are identified by oscillations in PLL error signal 190, PLL error signal 190 is provided to voltage regulator stabilizer 186, voltage regulator stabilizer 186 generates voltage regulator stabilization signal 188, and voltage regulator stabilization signal 188 is provided to voltage regulator 184. Voltage regulator stabilization signal 188 causes reactive current command signal 192 to oscillate in a manner that reduces and/or cancels system oscillations. Voltage regulator 184 transmits reactive current command signal 192 to converter interface controller 156. In an alternative embodiment, converter interface controller 156 is included within system controller 44. Other operating condition feedback from other sensors also may be used by controller 44 and/or converter interface controller 156 to control power conversion assembly 42.

Figure 6:
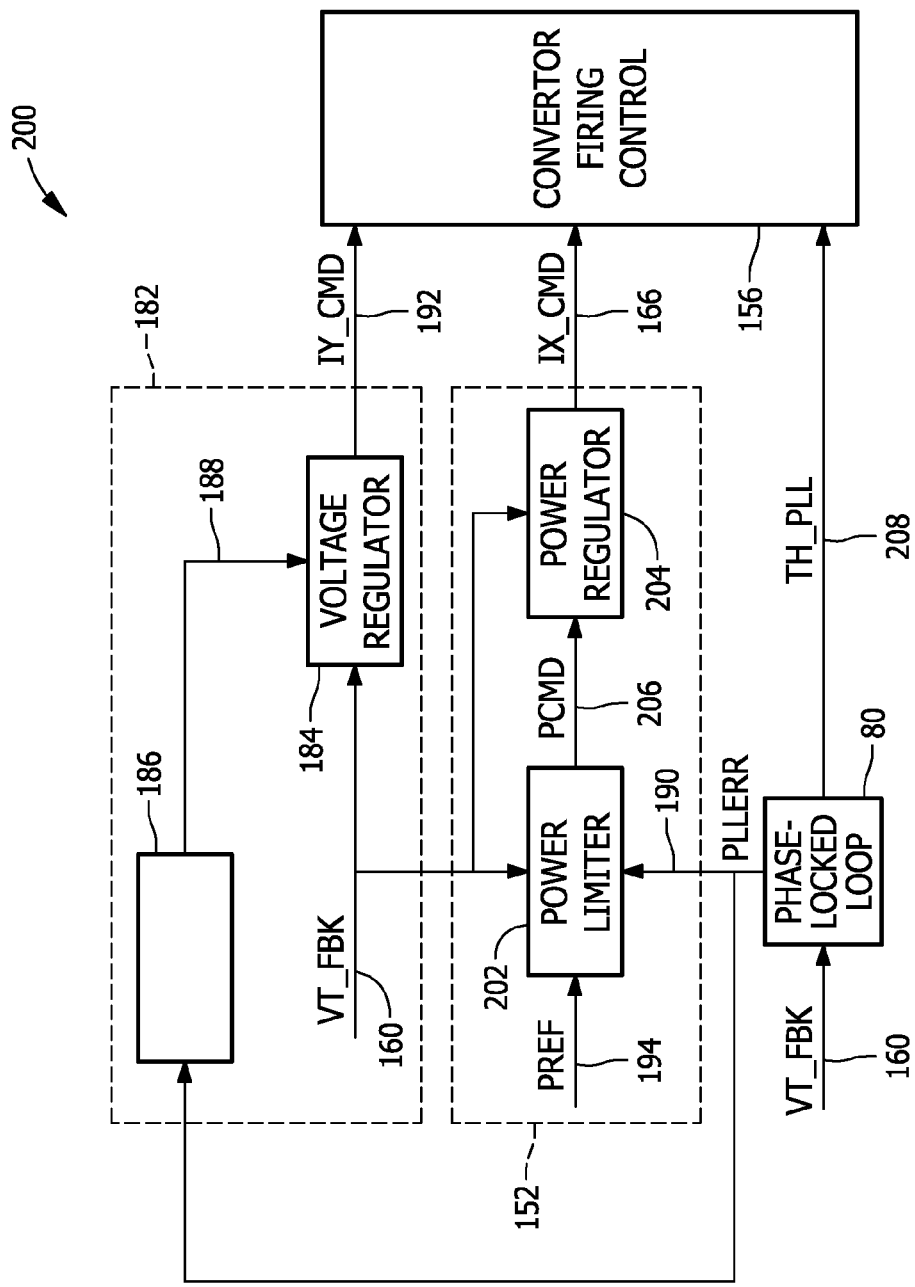
FIG. 6 is a block diagram of an exemplary converter control system that may be included within the power generation and delivery system shown in FIG. 5.

FIG. 6 is a block diagram of an exemplary converter control system 200 configured to generate control signals provided to a power converter, for example, power conversion assembly 42 (shown in FIG. 5), for control of power conversion assembly 42. In the exemplary embodiment, converter control system 200 includes power limiter system 152, stabilizer system 182, and converter interface controller 156. In the exemplary embodiment, power limiter system 152 includes a power limiter 202 and a power regulator 204 and outputs a power command signal, for example, real current command signal 166. In the exemplary embodiment, power limiter 180 receives at least one measured operating condition of system 150. The at least one measured operating condition may include, but is not limited to, a PLL error signal 190 from PLL regulator 80 and terminal grid voltage feedback signal 160 from sensor 54. Power limiter 180 also receives a stored reference power control signal 194 from, for example, system controller 44 (shown in FIG. 3). In some embodiments, power limiter 180 receives terminal grid voltage feedback signal 160 and stored reference power control signal 194. In other embodiments, power limiter 180 receives PLL error signal 190 and stored reference power control signal 194. In other embodiments, power limiter 180 receives both PLL error signal 190 and terminal grid voltage feedback signal 160, as well as stored reference power control signal 194. In the exemplary embodiment, power limiter 180 generates a power command signal 206 and transmits power command signal 206 to power regulator 204. Power regulator 204 generates real current command signal 166 and transmits real current command signal 166 to converter interface controller 156. Converter interface controller 156 may also be referred to herein as a converter firing control. As described above, PLL regulator 80 may be included within system controller 44, or may be coupled to, but separate from, system controller 44.

In the exemplary embodiment, PLL regulator 80 receives terminal voltage feedback signal 160. For example, PLL regulator 80 may receive terminal voltage feedback signal 160 (shown in FIG. 3 as Vt) provided by sensor 54 (shown in FIG. 3). As described above, PLL regulator 80 generates PLL error signal 190 and a PLL phase angle signal 208. PLL phase angle signal 208 is transmitted to converter interface controller 156 for control of power conversion assembly 42 and for subsequent control of electrical currents injected onto utility grid 136 (shown in FIG. 4).

In the exemplary embodiment, voltage regulator stabilizer 186 also receives PLL error signal 190. Furthermore, in the exemplary embodiment, voltage regulator stabilizer 186 applies a predefined transfer function to PLL error signal 190 to generate voltage regulator stabilization signal 188. Voltage regulator stabilization signal 188 is applied to voltage regulator 184, which combines signal 188 with voltage feedback signal 160 to generate reactive current command signal 192. Oscillations within PLL error signal 190 provide an indication of system oscillations that may occur after a grid contingency event. More specifically, oscillations within PLL error signal 190 correspond to system oscillations, for example, oscillations within terminal voltage 138 (shown in FIG. 5) and/or oscillations within output power 134 (shown in FIG. 5). Determining reactive current command signal 192 based partially on PLL error signal 190 facilitates reducing the system oscillations.

An example of the transfer function applied by voltage regulator stabilizer 186 isolates a frequency range within PLL error signal 190 that includes an indication of regulator oscillations (e.g., a band pass filter between 10 Hz and 30 Hz), and applies a gain selected to cause the regulator oscillations to be positively damped. The transfer function may be determined based on, for example, calculations, simulations, and/or testing where voltage regulator stabilizer 186 applies various voltage regulator stabilization signals 188 to voltage regulator 184. The transfer function may include linear components, for example, band pass filtering and gain, and may also include any nonlinear components, for example, but not limited to, limiters and dead bands, that allow system 150, in conjunction with electrical grid 136, to function as described herein. More specifically, voltage regulator stabilizer 186 may apply linear and/or nonlinear transfer functions to PLL error signal 190 to generate a voltage regulator stabilization signal 188 that dampens system oscillations.

Voltage regulator 184 receives voltage regulator stabilization signal 188 and generates reactive current command signal 192. Reactive current command signal 192 is provided to converter interface controller 156, which controls operation of power conversion assembly 42 in accordance with reactive current command signal 192.

Figure 7:
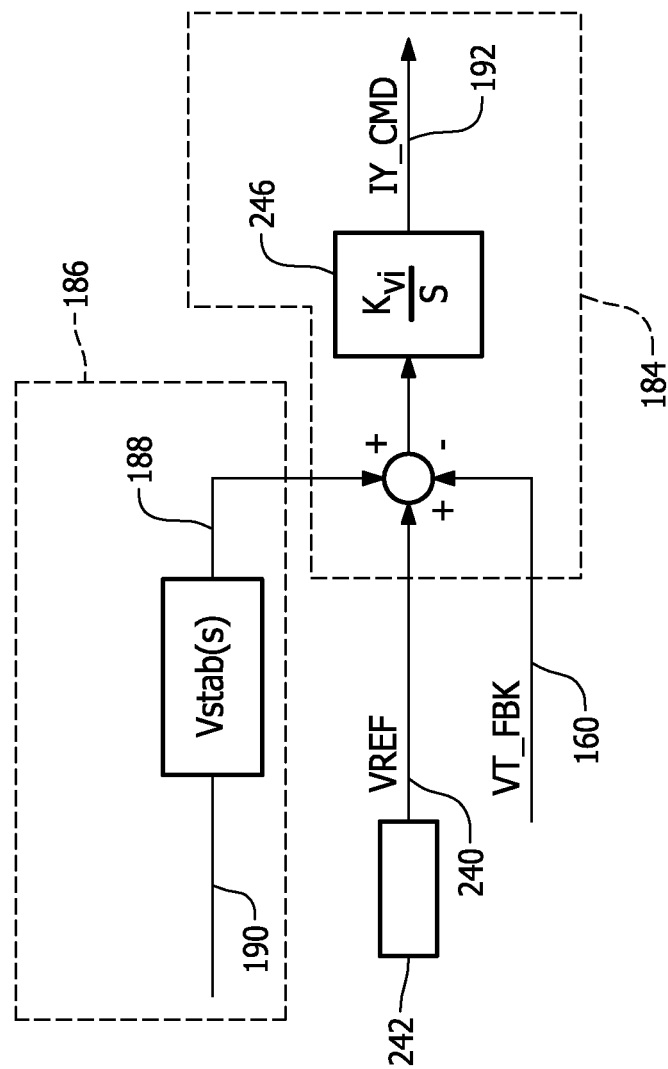
FIG. 7 is a block diagram of an exemplary stabilizer system that may be included within the converter control system shown in FIG. 6.

FIG. 7 is a block diagram of an exemplary voltage regulator, for example, voltage regulator 184 (shown in FIG. 6) and an exemplary voltage regulator stabilizer, for example voltage regulator stabilizer 186 (shown in FIG. 6). As described above with respect to FIG. 6, in the event of a grid contingency such as a weak grid, power output of conversion assembly 42 may oscillate. Voltage regulator stabilizer 186 receives PLL error signal 190 and generates voltage regulator stabilization signal 188. Voltage regulator 184 generates reactive current command signal 192 based on voltage regulator stabilization signal 188 and voltage feedback signal 160 and sends reactive current command signal 192 to converter interface controller 156. Reactive current command signal 192 instructs converter interface controller 156 to inject current onto utility grid 136 that includes a reactive component configured to dampen power output oscillations. Dampening power output oscillations increases the stability of grid 136 and power generation and delivery system 150.

In the exemplary embodiment, voltage regulator 184 receives voltage stabilizer signal 188 from voltage regulator stabilizer 186, receives terminal voltage feedback signal 160, and receives a reference voltage command signal (VREF) 240 from at least one volt-ampere reactive (VAR) regulator 242. VREF 240 is also referred to herein as a reference voltage. Upon detection of a grid contingency event, power limiter system 152 transmits real current command signal 166 (shown in FIG. 6) to converter interface controller 156 to reduce the output power of power conversion assembly 42. After the grid contingency event is completed, power limiter system 152 generates signals, for example real current command signal 166, that command a gradual increase in the power output of power conversion assembly 42. During the grid contingency event, e.g., terminal voltage 138 indicates occurrence of a grid contingency event, voltage regulator 184 generates a reactive current command signal 192 that increases the reactive current output by power conversion assembly 42 to support terminal grid voltage 138 until the grid contingency event is resolved. At the resolution of the grid contingency event, reactive current command signal 192 returns to a lower level, causing reactive current output by power conversion assembly 42 to decrease to approximately the level of reactive current output by power conversion assembly 42 prior to the grid contingency event. As the output power of power conversion assembly 42 increases during recovery from the grid contingency event, additional reactive current may be needed to maintain terminal voltage 138 and avoid voltage collapse of utility grid 136.

To facilitate reducing oscillations in the output power of conversion assembly 42, voltage regulator stabilizer 186 generates voltage regulator stabilization signal 188 and transmits voltage regulator stabilization signal 188 to voltage regulator 184. Voltage regulator stabilization signal 188 is added to reference voltage command signal 240. Hence, voltage regulator 184 generates a reactive current command signal 192 that includes a reactive current component configured to cancel oscillations in the power output by power conversion assembly 42. Voltage regulator 184 sums voltage regulator stabilization signal 188 and reference voltage command signal 240 and subtracts terminal voltage feedback signal 160 to produce an error signal. A control block 246 receives the error signal and generates reactive current command signal 192.

Figure 8:
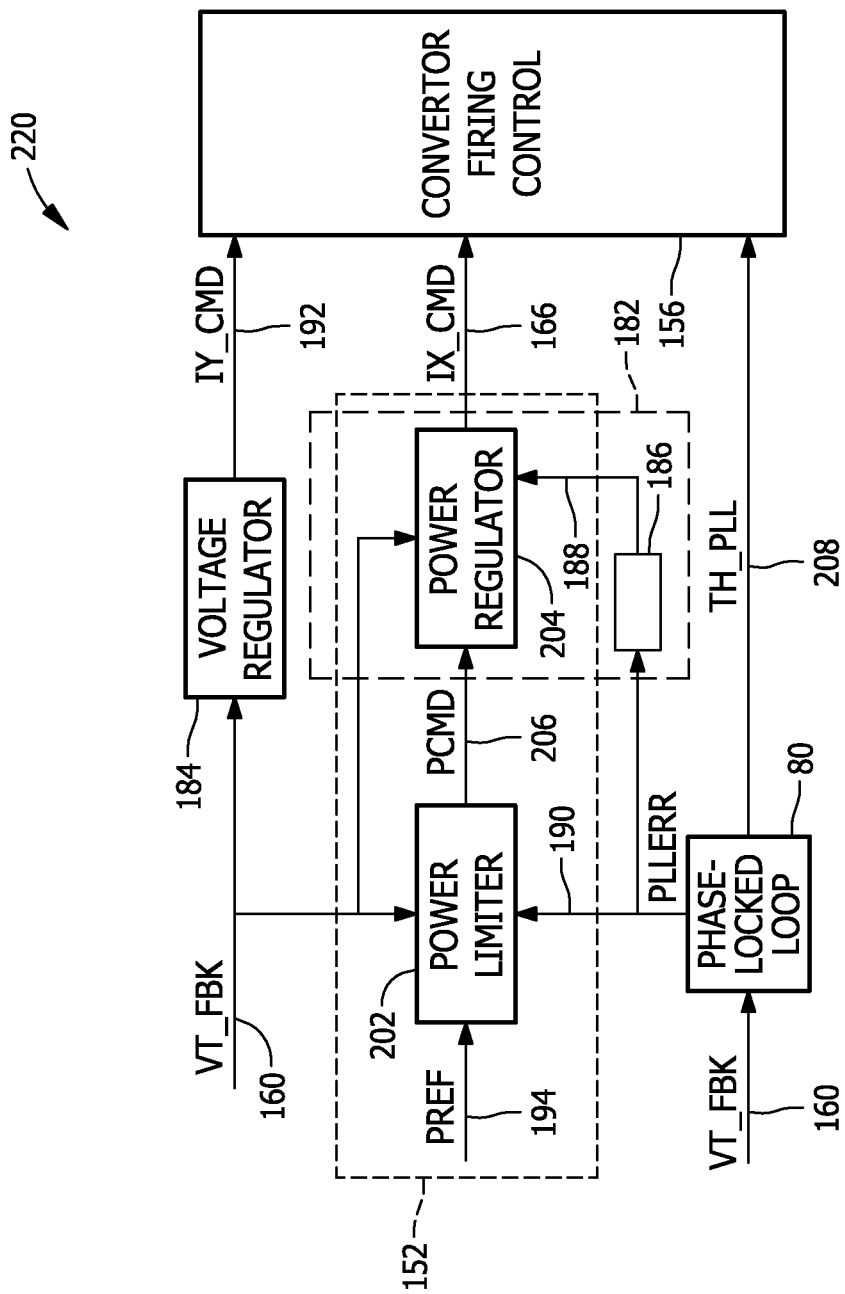
FIG. 8 is a block diagram of an alternative converter control system that may be included within the power generation and delivery system shown in FIG. 5.

FIG. 8 is a block diagram of an alternative embodiment of converter control system 200 (shown in FIG. 6) and identified herein as converter control system 220. Converter control system 220 is configured to generate control signals provided to a power converter, for example, power conversion assembly 42 (shown in FIG. 5), for control of power conversion assembly 42. In the alternative embodiment, stabilizer system 182 includes power regulator 204 that is configured to generate a real power command, for example, real current command signal 166. In the alternative embodiment, regulator stabilizer 186 is a power regulator stabilizer configured to generate stabilization signal 188, which is, more specifically, a power stabilization signal. Power stabilization signal 188 is provided to power regulator 204, which generates control signals based at least partially on signal 188. The control signals, for example, real current command signal 166, are provided to converter interface controller 156. In the alternative embodiment, converter control system 220 includes power limiter system 152, stabilizer system 182, and converter interface controller 156.

FIGS. 9-18 are graphical views illustrating operation of a power generation and delivery system after a grid contingency event. More specifically, FIGS. 9-13 illustrate operation of a power generation and delivery system that does not include a regulator stabilizer, for example, regulator stabilizer 186 (shown in FIG. 6). In contrast, FIGS. 14-18 illustrate operation of a power generation and delivery system, for example, power generation and delivery system 150 (shown in FIG. 5), that includes regulator stabilizer 186. The exemplary measurements illustrated in FIGS. 9-18 were obtained through experimentation and/or calculation and are included to illustrate the effect of operation of regulator stabilizer 186 on power generation and delivery system 150.

Figure 9:
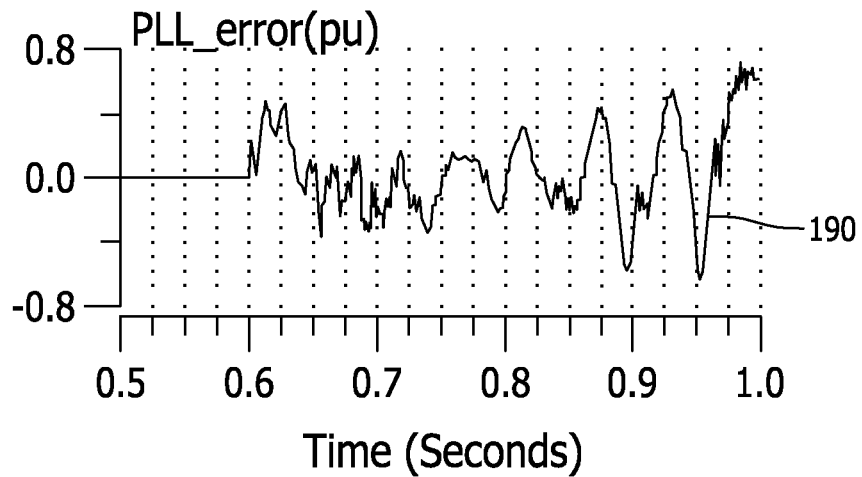
FIGS. 9-18 are graphical views illustrating operation of a power generation and delivery system after a grid contingency event.
Figure 14:
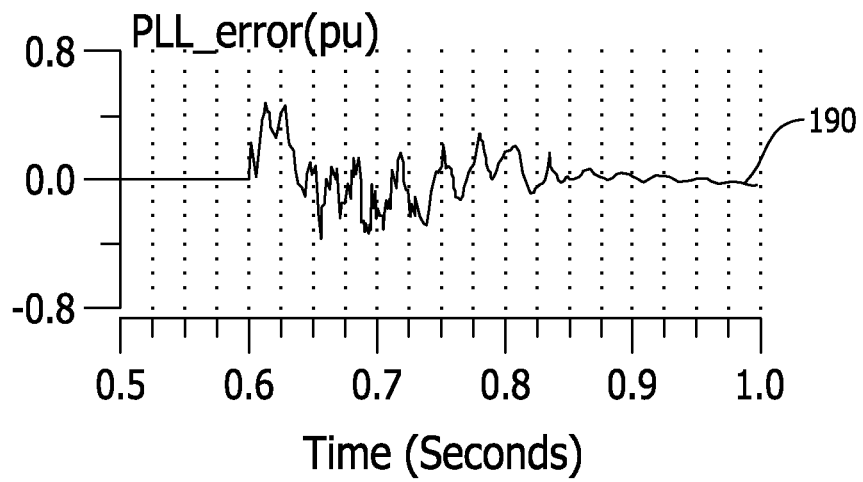

FIGS. 9 and 14 are graphical views of PLL error signal 190 versus time. As described above, after a grid contingency event, system oscillations arising from operation of voltage regulator 184 (shown in FIG. 6) are measured and apparent in PLL error signal 190 (see FIG. 9). FIG. 14 illustrates the reduction in system oscillations, as shown by the reduction in PLL error signal 190 oscillations.

Figure 10:
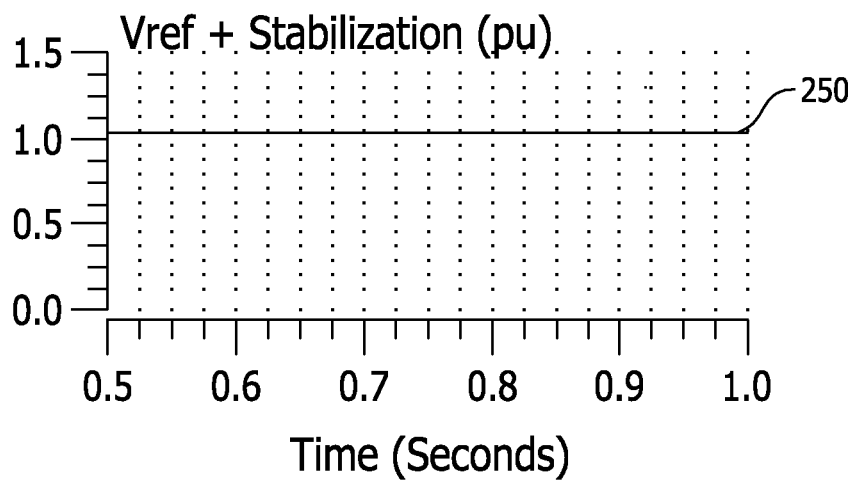
Figure 15:
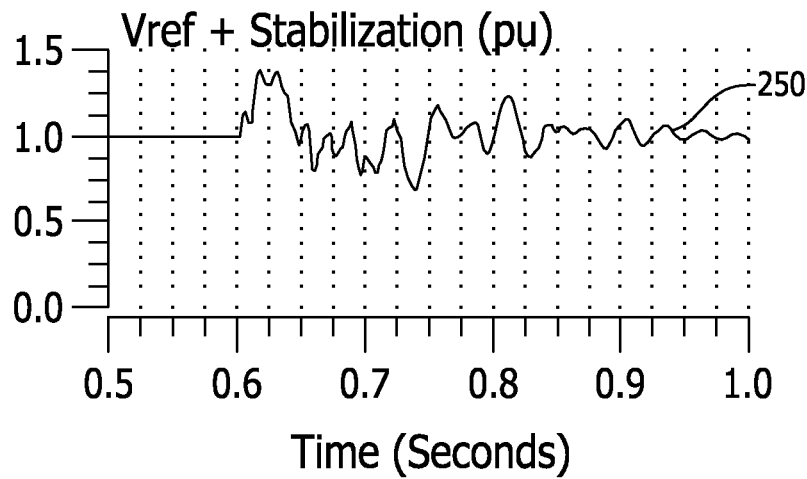

FIGS. 10 and 15 are graphical views of a sum 250 of reference voltage command signal 240 and voltage regulator stabilization signal 188 (both shown in FIG. 7) versus time. As illustrated in FIG. 10, without voltage regulator stabilizer 186, no voltage regulator stabilization signal 188 is provided to voltage regulator 184. Therefore, sum 250 of reference voltage command signal 240 and voltage regulator stabilization signal 188 equals reference voltage command signal 240, which in the illustrated example, is a constant over time.

As shown in FIG. 15, sum 250 of reference voltage command signal 240 and voltage regulator stabilization signal 188 varies over time. Reference voltage command signal 240 remains a constant, however, voltage regulator stabilization signal 188 varies over time.

Figure 11:
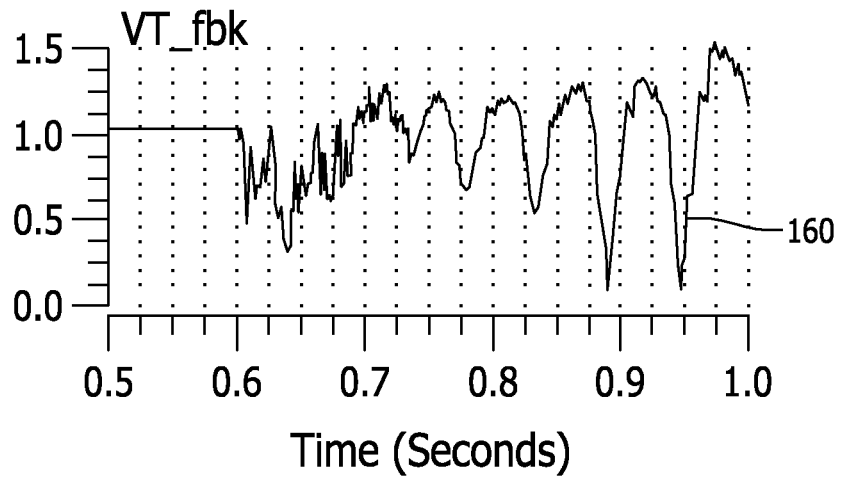
Figure 16:
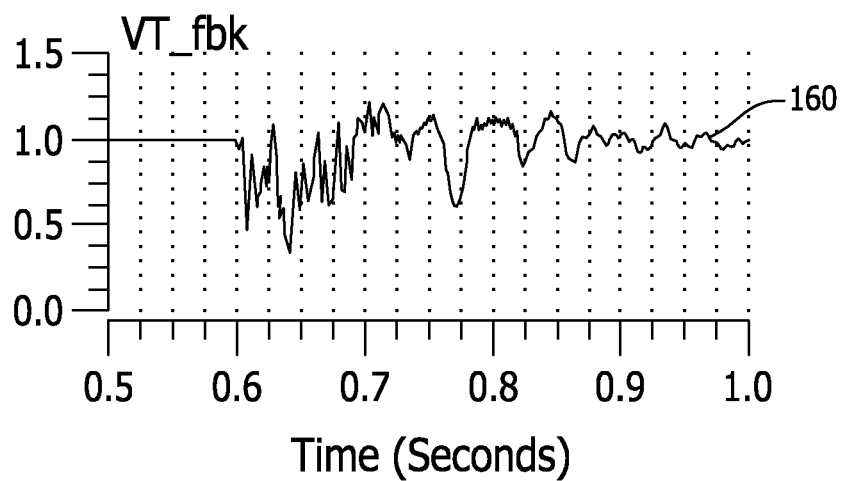

FIGS. 11 and 16 are graphical views of terminal voltage feedback signal 160 (shown in FIG. 7) versus time. In the illustrated example, the oscillation of terminal voltage feedback signal 160 is an example of a system oscillation that occurs, for example, while system 150 is recovering from a grid contingency event. FIG. 11 illustrates a system oscillation (e.g., oscillations of terminal voltage feedback signal 160) increasing over time. FIG. 16 illustrates the reduction in system oscillations (e.g., reduction in terminal voltage feedback signal 160 oscillations), caused by operation of voltage regulator stabilizer 186. More specifically, FIG. 16 illustrates how application of sum 250 (shown in FIG. 15) to operation of voltage regulator 184 dampens oscillations of terminal voltage feedback signal 160.

Figure 12:
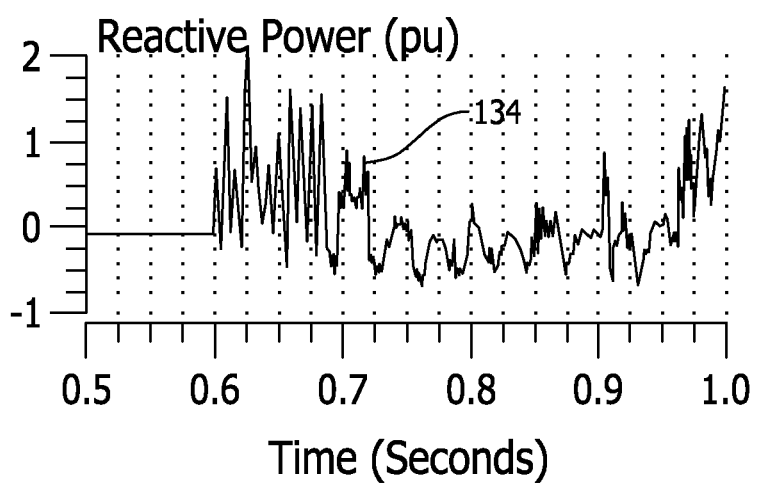
Figure 13:
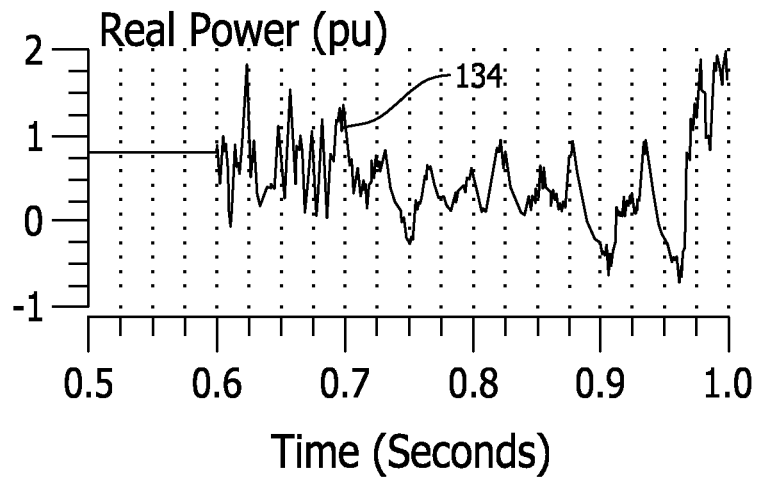

FIGS. 12 and 13 are graphical views of electrical power 134 (shown in FIG. 5) versus time in a power generation and delivery system that does not include voltage regulator stabilizer 186. More specifically, FIG. 12 illustrates a reactive power component of electrical power 134 and FIG. 13 illustrates a real power component of electrical power 134. The oscillations of electrical power 134 illustrated in FIGS. 12 and 13 are another example of system oscillations that may occur while system 150 is recovering from a grid contingency event.

Figure 17:
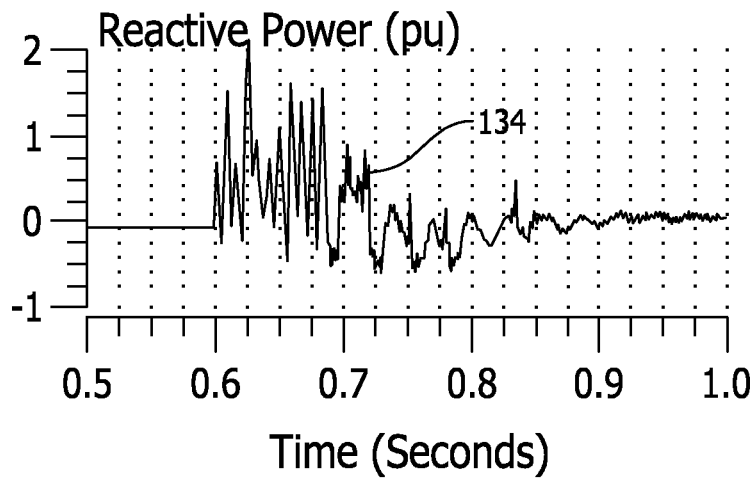
Figure 18:
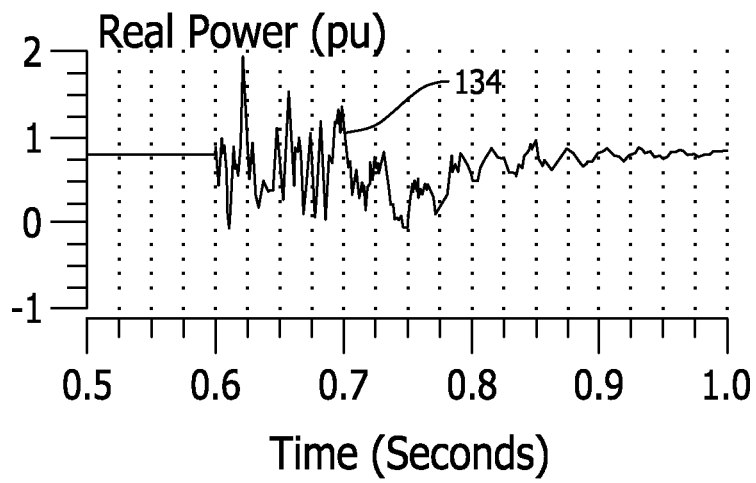

FIGS. 17 and 18 are graphical views of electrical power 134 (shown in FIG. 5) versus time in a power generation system that includes a voltage regulator stabilizer, for example, power generation system 150 that includes voltage regulator stabilizer 186. FIGS. 17 and 18 illustrate the reduction in system oscillations, more specifically, the reduction in the oscillations of electrical power 134, caused by operation of voltage regulator stabilizer 186.

Figure 19:
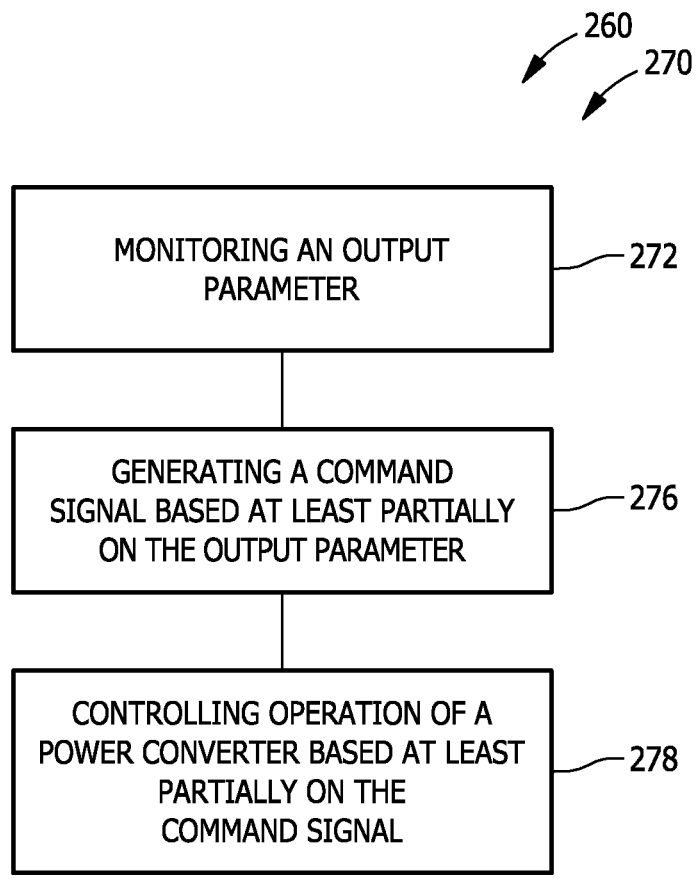
FIG. 19 is a flow chart of an exemplary method for controlling the power generation and delivery system shown in FIG. 5.

FIG. 19 is a flow chart 260 of an exemplary method 270 for controlling a power generation and delivery system, for example, power generation and delivery system 150 (shown in FIG. 5). In the exemplary embodiment, power generation and delivery system 150 includes an electrical generator, for example, electrical generator 34 (shown in FIG. 5), a power converter, for example power conversion assembly 42 (shown in FIG. 5), and a system controller, for example, system controller 44 (shown in FIG. 4).

In the exemplary embodiment, method 270 includes monitoring 272 an output parameter of power generation and delivery system 150 that is indicative of system oscillations. For example, a PLL regulator, for example, PLL regulator 80 (shown in FIG. 4), may monitor 272 a PLL error, and generate a PLL error signal, for example, PLL error signal 190. The output parameter may also include, but is not limited to, a voltage feedback signal, for example, voltage feedback signal 160 (shown in FIG. 5). As described above, oscillations within PLL error signal 190 are indicative of system oscillations.

In the exemplary embodiment, method 270 also includes generating 276 a command signal, for example, reactive current command signal 192 (shown in FIG. 5) and/or real current command signal 166 (shown in FIG. 5), based at least partially on the output parameter. For example, system controller 44 may generate 276 the command signal by applying a transfer function to PLL error signal 190 to generate a voltage regulator stabilization signal, for example, voltage regulator stabilization signal 188 (shown in FIG. 6). A voltage regulator, for example, voltage regulator 184 (shown in FIG. 6) is configured to generate command signal 192 based at least partially on voltage regulator stabilization signal 188. In an alternative embodiment, system controller 44 may generate 276 the command signal by applying a transfer function to PLL error signal 190 to generate a power regulator stabilization signal, for example, power regulator stabilization signal 188 (shown in FIG. 8). A power regulator, for example, power regulator 204 (shown in FIG. 8) is configured to generate command signal 166 based at least partially on power regulator stabilization signal 188.

More specifically, generating 276 command signal 192 may include summing voltage regulator stabilization signal 188, a reference voltage command signal, for example, reference voltage command signal 240 (shown in FIG. 7), and an inverse of terminal voltage feedback signal 160 (shown in FIG. 7). Moreover, applying the transfer function may include applying a predefined transfer function to PLL error signal 190 that isolates a frequency range within PLL error signal 190 that includes an indication of system oscillations. Applying the transfer function may also include applying a predefined gain to PLL error signal 190 to positively dampen system oscillations.

In the exemplary embodiment, method 270 also includes controlling 278 operation of power converter 42 based at least partially on reactive current command signal 192 and/or the real current command signal 166 to reduce system oscillations.

The above-described embodiments facilitate efficient and cost-effective operation of a wind turbine. The wind turbine includes a voltage regulator stabilizer system that generates a voltage regulator stabilization signal based at least partially on a measured PLL error. The voltage regulator stabilization signal is provided to a voltage regulator that determines a reactive current command based at least partially on the voltage regulator stabilization signal. Controlling the reactive current output as a function of the PLL error facilitates reducing system oscillations that may occur during recovery from a grid contingency event. The method and systems described herein facilitate increasing the stability of the voltage regulator, and furthermore, the stability voltage and/or power output by the wind turbine following a grid contingency event.

Exemplary embodiments of a wind turbine, voltage regulator stabilizer system, and methods for operating a wind turbine in response to an occurrence of a grid contingency event are described above in detail. The methods, wind turbine, and voltage regulator stabilizer system are not limited to the specific embodiments described herein, but rather, components of the wind turbine, components of the voltage regulator stabilizer system, and/or steps of the methods may be utilized independently and separately from other components and/or steps described herein. For example, the voltage regulator stabilizer system and methods may also be used in combination with other wind turbine power systems and methods, and are not limited to practice with only the power system as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A stabilizer system associated with a power converter controller, the stabilizer system comprising:
   a regulator stabilizer configured to receive a phase locked loop (PLL) error signal and to generate a regulator stabilization signal based at least partially on the PLL error signal, wherein the PLL error signal includes an indication of system oscillations of a utility grid therein; and,
   a regulator coupled to said regulator stabilizer and a converter interface controller, said regulator configured to:
      receive the regulator stabilization signal;
      generate a first command signal, based at least partially on the regulator stabilization signal, that reduces the system oscillations; and,
      transmit the first command signal to the converter interface controller.

2. A system in accordance with claim 1, wherein said regulator stabilizer is further configured to apply a predefined transfer function to the PLL error signal, wherein the regulator stabilization signal is an output of the predefined transfer function.

3. A system in accordance with claim 2, wherein the predefined transfer function isolates a frequency range within the PLL error signal that includes the indication of system oscillations and applies a gain to positively dampen the system oscillations.

4. A system in accordance with claim 1, wherein the indication of system oscillations within the PLL error signal corresponds to system oscillations including at least one of oscillations of a terminal voltage at an output of a power converter associated with the power converter controller and electrical power output by the power converter, and wherein the system oscillations correspond to system instability.

5. A system in accordance with claim 4, wherein the first command signal, when provided to the converter interface controller and used to control operation of the power converter, dampens the system oscillations.

6. A system in accordance with claim 1, wherein said regulator comprises at least one of a voltage regulator and a power regulator, and wherein the first command signal comprises at least one of a reactive current command signal generated by said voltage regulator and a real current command signal generated by said power regulator.

7. A system in accordance with claim 6, wherein said voltage regulator is further configured to receive a voltage feedback signal, and wherein said voltage regulator generates the reactive current command signal based on the regulator stabilization signal and the voltage feedback signal.

8. A converter controller for controlling operation of a power conversion assembly, said converter controller comprising:
   a stabilizer system configured to:
      receive a phase locked loop (PLL) error signal, wherein the PLL error signal includes an indication of system oscillations of a utility grid therein; and,
      generate a first command signal, based at least partially on the PLL error signal, that reduces the system oscillations; and,
   a converter interface controller communicatively coupled to said stabilizer system and configured to generate control signals based at least partially on the first command signal and transmit the control signals to the power conversion assembly.

9. A converter controller in accordance with claim 8, wherein the system oscillations include at least one of oscillations of terminal voltage and/or electrical power output by the power conversion assembly, and wherein the system oscillations correspond to system instability.

10. A converter controller in accordance with claim 8, wherein said stabilizer system comprises:
    a regulator stabilizer configured to receive the PLL error signal and to generate a regulator stabilization signal; and,
    a regulator coupled to said regulator stabilizer and configured to receive the regulator stabilization signal, generate the first command signal, based at least partially on the regulator stabilization signal, and provide the first command signal to said converter interface controller.

11. A converter controller in accordance with claim 10, wherein said regulator is further configured to receive a terminal voltage feedback signal, and wherein said regulator generates the first command signal based on the regulator stabilization signal and the terminal voltage feedback signal.

12. A converter controller in accordance with claim 10, wherein said regulator comprises at least one of a voltage regulator and a power regulator, and wherein the first command signal comprises at least one of a reactive current command signal generated by said voltage regulator and a real current command signal generated by said power regulator.

13. A converter controller in accordance with claim 10, wherein said regulator stabilizer is configured to apply a predefined transfer function to the PLL error signal, wherein the regulator stabilization signal is an output of the predefined transfer function, and wherein the predefined transfer function isolates a frequency range within the PLL error signal that includes the indication of system oscillations and applies a gain to positively dampen the system oscillations.

14. A method for controlling a power generation and delivery system that includes an electrical generator, a power converter, and a controller, the power generation and delivery system coupled to a utility grid, said method comprising:
    monitoring an output parameter of the power generation and delivery system indicative of system oscillations on the utility grid;
    generating, using the controller, a command signal based at least partially on the output parameter; and,
    controlling operation of the power converter based at least partially on the command signal to reduce the system oscillations.

15. A method in accordance with claim 14, wherein monitoring an output parameter comprises receiving, at the controller, at least one of a phase locked loop (PLL) error signal and a terminal voltage feedback signal.

16. A method in accordance with claim 15, wherein generating the command signal comprises:
   applying a transfer function to the PLL error signal to generate a regulator stabilization signal; and,
   providing the regulator stabilization signal to a regulator configured to generate the command signal based at least partially on the regulator stabilization signal.

17. A method in accordance with claim 16, wherein providing the regulator stabilization signal to a regulator comprises providing the regulator stabilization signal to a voltage regulator configured to generate a reactive current command signal based at least partially on the regulator stabilization signal.

18. A method in accordance with claim 17, wherein generating the reactive current command signal comprises summing the regulator stabilization signal, a reference voltage signal, and an inverse of the terminal voltage feedback signal.

19. A method in accordance with claim 16, wherein providing the regulator stabilization signal to a regulator comprises providing the regulator stabilization signal to a power regulator configured to generate a real current command signal based at least partially on the regulator stabilization signal.

20. A method in accordance with claim 16, wherein applying the transfer function comprises applying a predefined transfer function to the PLL error signal that isolates a frequency range within the PLL error signal that includes the indication of system oscillations, wherein the predefined transfer function includes a predefined gain for positively dampening the system oscillations.

\* \* \* \* \*